Patented Mar. 21, 1944

2,344,709

UNITED STATES PATENT OFFICE 2,344,709

MASTIC COMPOSITION

Edward A. Lasher, Los Angeles, Calif., assignor to California Flaxseed Products Company, Los Angeles, Calif., a corporation of California No Drawing. Application March 31, 1942, Serial No. 437,025

22 Claims. (Cl. 106—171)

This invention relates to a mastic composition and in particular to a plastic material suitable for filling cracks and seams and as a sealer between structural sheets in tanks for storage of hydrocarbon solvents of the nature of aviation gasoline.

The object of my invention is to provide a plastic material which retains its softness and plasticity over long periods of time, and which is resistant to the solvent action of aliphatic hydrocarbons, and mixtures containing aromatic hydrocarbons, and which may be used as a filling material for seams, cracks and joints in tanks and the like.

My composition contains a plastic cohesive base material and a filler. It preferably also contains a metal corrosion inhibitor such as zinc chromate, to lessen or avoid the corrosion when the mastic is used on metals.

I have found that a plastic resinous material formed by the interaction, under suitable conditions, of an hydroxylated fatty oil such as blown castor oil, and a hydroxy polybasic acid, or a mixture of hydroxy mono- or poly-basic aliphatic acids, gives a suitable base for use in my mastic composition. Since mastic or gasket material used in stopping cracks and seams in tanks for aviation gasoline will come in contact with mixtures containing both aromatic and aliphatic hydrocarbons, the base material as well as the filler and other ingredients must be insoluble in these solvents. My interaction product has these required properties.

My mastic may be prepared as follows: A mixture of 20 parts by weight of blown castor oil (Saybolt 210° viscosity, 285) and 11 parts of citric acid is heated to about 400° F. raising the temperature gradually over a period of one and one-half hours and holding at the maximum temperature for a few minutes. Water vapor is given off, and the mixture must be stirred to prevent frothing over. A resinous plastic product having considerable stringiness and tackiness is produced. It is non-hygroscopic and non-drying, and is not dissolved or swelled appreciably by mixed aliphatic and aromatic hydrocarbon solvents. About fifteen parts of asbestos fiber (4xC grade) and .5 part of zinc chromate were mixed into 100 parts by weight of the resin base, to form a uniform mastic compound. This mixture adheres well to metal surfaces, does not dissolve nor become loosened by aviation gasoline, does not harden or form a hard skin after exposure for fairly long periods of time. It is readily workable into cracks and seams because it is quite plastic and cohesive.

For certain purposes, a mastic is required which will not change in consistency over long periods of time, and I have found that the resin base giving this improved stability may be prepared by replacing part of the citric acid by lactic acid, and reacting the ingredients in a manner similar to that above described. For example, I have mixed 240 parts by weight of blown castor oil (viscosity Saybolt 210°, 285) 144 parts citric acid, and 90 parts lactic acid (85%) and then heated the mixture gradually with stirring to about 360° F. and held it at that temperature for about one-half hour. The resinous product is plastic tacky, non-hygroscopic, and is not appreciably dissolved or swelled in mixed aliphatic and aromatic hydrocarbons. About 87 parts asbestos fiber and 2 parts of zinc chromate were then added and mixed into the resin. A readily workable adherent plastic material was produced which is quite insoluble in aviation gasoline, and which retains its consistency over long periods of time.

The consistency of the mastic composition may be varied by the amount and kind of inert filler which is used, as well as by changes in the consistency of the resin base. Any of the common inert filling materials such as asbestos, cotton linters, diatomaceous earth, clay, wood fiber, mineral wool, glass wool, etc., may be used, and the amount may be varied depending upon the particular filler used and the stiffness wanted in the mastic; from 18 to 45 parts of filler to 100 parts by weight of mastic composition is the usual range.

The resistance of the base material, and the mastic composition to hydrocarbon solvents may be increased by the addition of cellulose esters or ethers. For example, the following composition gave a satisfactory mastic product:

Blown castor oil Saybolt 210° viscosity, 285)
_____parts by weight___ 800
Citric acid_____parts___ 480
Lactic acid (85%)_____do____ 300

After heating slowly to 400° to get the partial esterification reaction, and an acid number of about 235, one hundred parts of ethyl cellulose was added to and dispersed or dissolved in the above batch, after it had cooled to about 300° F., following which 600 parts asbestos fiber and 15 parts of zinc chromate was added.

The consistency of the resin base may be varied by the proportions of the ingredients as well as by the time of heating them in forming the resin base. In general, the viscosity of the resin is higher the lower the proportion of castor oil to acids; and the longer the material is heated at the reaction temperature, the more viscous is the product. In all cases, the final product is acid in character, an acid number of about 220 to 230 being preferred. The resin base materials are believed to be partial esters and will be so designated herein.

While the blown castor oil is preferred as an ingredient in my resin base, it may be replaced by either raw castor oil, blown linseed oil, or other raw or blown oils having high "acetyl numbers" whose reactions are equivalent to these in producing the resinous base products.

In the resin base compositions including blown castor oil, the proportion of oil to acid or acids may be varied from a ratio of about 2 parts oil to one part of acid, to a ratio of one part oil to two of acid, by weight. In general the higher the proportion of acid, the greater is the viscosity, and the lower is the hydrocarbon solubility, stability and water resistance.

Hydroxy polybasic acids, such as malic and tartaric, may be used in place of citric acid.

The stability of the resin base, and therefore of the mastic composition, against changes in consistency with time, and against surface hardening or skin formation, is increased by replacing up to one-fourth of the citric acid content of the mixture for the resin base prior to heating, by one of the dibasic acids such as oxalic, malonic, succinic, glutaric, adipic, and sebacic acids. This substitution does not appreciably increase the solubility of the resin base in aviation gasoline.

The stability of my mastic may also be improved by adding an anti-oxidant to the extent of about two-tenths percent to one percent on the weight of base material. For this purpose, I prefer to use pyrogallic acid because of its insolubility in hydrocarbon solvents.

If the filler material for my mastic composition is inorganic and unaffected by the reaction temperature used, it may be added to the mixture of hydroxylated oil and selected acids prior to heating this to bring about the chemical reaction, with the advantage of better distribution of the filler. The filler may also be added to the pre-formed resin base.

My mastic composition may be worked into seams and cracks as a plastic putty-like compound. It remains soft and plastic for a long time, and adheres strongly to metal surfaces, and does not swell nor soften nor appreciably dissolve in hydrocarbon solvents. My composition may be spread out as a coating on one or both sides of fabric or paper web to facilitate its use in covering seams, as gasket material, or for interlining or sealing.

While I have described preferred mixtures for my mastic compositions, I do not wish to be restricted to these exact compositions, but limit my invention only insofar as required by the state of the prior art and the spirit of the appended claims.

Reference is made to my copending application Serial No. 437,022 filed March 31, 1942, in which is disclosed and claimed the resin base component of the mastic composition herein described and claimed.

I claim:

1. A mastic composition comprising a resin base and an inert solid filler, said resin base comprising the partial ester of an hydroxylated fatty oil and a hydroxy polybasic aliphatic carboxylic acid having from 3 to 7 carbon atoms, the acid resin base having an acid number of about 230.

2. A mastic composition comprising a resin base and an inert solid filler, said resin base comprising the partial ester of an hydroxylated fatty oil and an acid selected from the group consisting of citric, malic, and tartaric, said acid resin base having an acid number of about 230.

3. A mastic composition comprising a resin base and an inert solid filler, said resin base comprising the partial ester of an hydroxylated fatty oil and citric acid, said acid resin base having an acid number of about 230.

4. A mastic composition comprising a resin base and an inert solid filler, said resin base comprising the partial ester of an hydroxylated fatty oil and malic acid, said acid resin base having an acid number of about 230.

5. A mastic composition comprising a resin base and an inert solid filler, said resin base comprising the partial ester of blown castor oil and an acid selected from the group consisting of citric acid, malic acid and tartaric acid, said acid resin base having an acid number of about 230.

6. A mastic composition comprising a resin base and an inert solid filler, said resin base comprising the partial ester of blown castor oil and citric acid, said acid resin base having an acid number of about 230.

7. A mastic composition comprising a resin base and an inert solid filler, said resin base comprising the partial ester of blown castor oil and malic acid, said acid resin base having an acid number of the number of about 230.

8. A mastic composition comprising a resin base and an inert solid filler, said resin base comprising the partial ester of two parts blown castor oil with from one to four parts of citric acid, said acid resin base having an acid number of about 230.

9. A mastic composition comprising a resin base and an inert solid filler, said resin base comprising the partial ester of an hydroxylated fatty oil, a hydroxy polybasic aliphatic carboxylic acid, and a hydroxy monobasic aliphatic carboxylic acid, said acid resin base having an acid number of about 230.

10. A mastic composition comprising a resin base and an inert solid filler, said resin base comprising the partial ester of castor oil, a hydroxy polybasic aliphatic carboxylic acid, and a hydroxy monobasic aliphatic carboxylic acid, said acid resin base having an acid number of about 230.

11. A mastic composition comprising a resin base and an inert solid filler, said resin base comprising the partial ester of blown castor oil, a hydroxy polybasic aliphatic carboxylic acid, and a hydroxy monobasic aliphatic carboxylic acid, said acid resin base having and acid number of about 230.

12. A mastic composition comprising a resin base and an inert solid filler, said resin base comprising the partial ester of blown linseed oil, a hydroxy polybasic aliphatic carboxylic acid, and a hydroxy monobasic aliphatic carboxylic acid, said acid resin base having an acid number of about 230.

13. A mastic composition comprising a resin base and an inert solid filler, said resin base comprising the partial ester of castor oil; an acid selected from the group consisting of citric acid, malic acid, and tartaric acid; and a hydroxy monobasic aliphatic carboxylic acid, said acid resin base having an acid number of about 230.

14. A mastic composition comprising a resin base and an inert solid filler, said resin base comprising the partial ester of blown castor oil; an acid selected from the group consisting of citric acid, malic acid, and tartaric acid; and a hydroxy monobasic aliphatic carboxylic acid, said acid resin base having an acid number of about 230.

15. A mastic composition comprising a resin base and an inert solid filler, said resin base comprising the partial ester of blown linseed oil; an acid selected from the group consisting of citric acid, malic acid, and tartaric acid; a hydroxy monobasic aliphatic carboxylic acid, said acid resin base having an acid number of about 230.

16. A mastic composition comprising a resin base and an inert solid filler, said resin base comprising the partial ester of an hydroxylated fatty oil; an aliphatic acid selected from the group consisting of citric acid, malic acid, and tartaric acid; and lactic acid, said acid resin base having an acid number of about 230.

17. A mastic composition comprising a resin base and an inert solid filler, said resin base comprising the partial ester of blown castor oil; an aliphatic acid selected from the group consisting of citric acid, malic acid, and tartaric acid; and lactic acid, said acid resin base having an acid number of about 230.

18. A mastic composition comprising a resin base and an inert solid filler, said resin base comprising the partial ester of blown linseed oil; an aliphatic acid selected from the group consisting of citric acid, malic acid, and tartaric acid; and lactic acid, said acid resin base having an acid number of about 230.

19. A mastic composition comprising a resin base and an inert solid filler, said resin base comprising the partial ester of raw castor oil; an aliphatic acid selected from the group consisting of citric acid, malic acid, and tartaric acid; and lactic acid, said acid resin base having an acid number of about 230.

20. A mastic composition comprising a resin base and an inert solid filler, said resin base comprising the partial ester of an hydroxylated fatty oil; an aliphatic acid selected from the group consisting of citric acid, malic acid, and tartaric acid; lactic acid; and a dibasic acid selected from the group consisting of oxalic acid, malonic acid, succinic acid, glutaric acid, adipic acid, and sebacic acid, said acid resin base having an acid number of about 230.

21. A mastic composition comprising a resin base, a lacquer-making cellulose derivative selected from the group consisting of cellulose esters and cellulose ethers dispersed in said resin, and an inert solid filler, said resin base comprising the partial ester of an hydroxylated fatty oil and a hydroxy polybasic aliphatic carboxylic acid having from 3 to 7 carbon atoms, said acid resin base having an acid number of about 230.

22. A sealing tape comprising a flexible web coated with a tacky hydrocarbon-insoluble mastic composition comprising a partial ester of an hydroxylated fatty oil, a hydroxy polybasic aliphatic carboxylic acid having from 3 to 7 carbon atoms, and an acid selected from the group consisting of hydroxy monobasic aliphatic carboxylic acids and dicarboxylic (non-hydroxy) aliphatic acids, said partial ester having an acid number of about 230.

EDWARD A. LASHER.